United States Patent [19]

Heckles

[11] 4,217,439
[45] Aug. 12, 1980

[54] ACRYLATE-ACETOACETAMIDE POLYMERS

[75] Inventor: John S. Heckles, Lancaster, Pa.

[73] Assignee: Armstrong Cork Company, Lancaster, Pa.

[21] Appl. No.: 916,967

[22] Filed: Jun. 19, 1978

[51] Int. Cl.$^2$ .............................................. C08G 2/26
[52] U.S. Cl. ................................. 528/220; 260/561 P; 428/474; 528/222; 528/224; 528/228; 528/229; 544/382; 560/115; 560/158
[58] Field of Search ............... 528/222, 228, 229, 220, 528/224

[56] References Cited

U.S. PATENT DOCUMENTS

| | | | |
|---|---|---|---|
| 3,017,388 | 1/1962 | Caldwell et al. | 528/228 |
| 3,053,804 | 9/1962 | Caldwell et al. | 528/228 |

Primary Examiner—Lester L. Lee
Attorney, Agent, or Firm—Dennis M. Kozak

[57] ABSTRACT

Crosslinked acrylate-acetoacetamide polymers are disclosed. These polymers are prepared by the reaction of at least one polyfunctional acrylate with at least one diacetoacetamide in the presence of a catalyst capable of promoting the reaction between the polyfunctional acrylate and the diacetoacetamide. In a preferred embodiment, the polymers are employed to produce wear layer compositions for surface coverings.

8 Claims, No Drawings

ACRYLATE-ACETOACETAMIDE POLYMERS

This invention relates to polymers.

More specifically, this invention relates to acrylate-acetoacetamide polymers and to coatings or films produced from these polymers.

In one of its more specific aspects, this invention pertains to crosslinked polymers which are the reaction products of polyfunctional acrylates and diacetoacetamides.

The resilient flooring industry is continually searching for new abrasion-resistant polymeric compositions which will serve as wear layers for decorative surface coverings, especially thermoplastic floor coverings.

The present invention provides novel acrylate-acetoacetamide polymers which exhibit excellent film-forming properties and abrasion-resistant properties. Accordingly, these polymers, in film form, are well suited for use as wear layers for decorative thermoplastic floor coverings.

According to this invention, there is provided a crosslinked acrylate-acetoacetamide polymer produced by the reaction of at least one polyfunctional acrylate with at least one diacetoacetamide in the presence of a catalyst capable of promoting the reaction between the polyfunctional acrylate and the diacetoacetamide.

Also, according to this invention, there is provided a thermoplastic floor covering coated with a wear layer composition comprising a crosslinked acrylate-acetoacetamide polymer produced by the reaction of at least one polyfunctional acrylate with at least one diacetoacetamide in the presence of a catalyst capable of promoting the reaction between the polyfunctional acrylate and the diacetoacetamide.

As the polyfunctional acrylate, use can be made of compounds having the formula $$R+O-C(O)-CH=CH_2)_4,$$

$$R^1+O-C(O)-CH=CH_2)_3, \text{ or}$$

$$R^2+O-C(O)-CH=CH_2)_2$$

wherein R represents

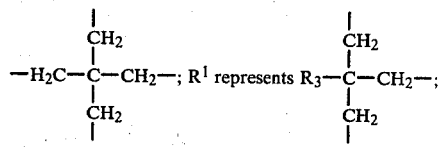

$R^2$ represents: a ($C_1$ to $C_{10}$) alkylene group, a ($C_1$ to $C_4$) alkyl substituted ($C_1$ to $C_{10}$) alkylene group, $+C_2H_4O+_a+C_2H_4+$,

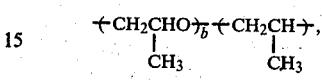

$+CH_2CH_2CH_2CH_2O+_c CH_2CH_2CH_2CH_2-$, a cycloalkylene group, a cycloalkane bearing two ($C_1$ to $C_3$)alkylene groups,

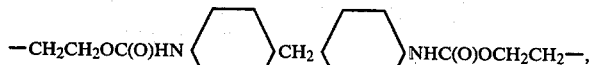

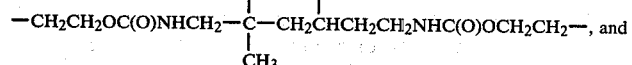

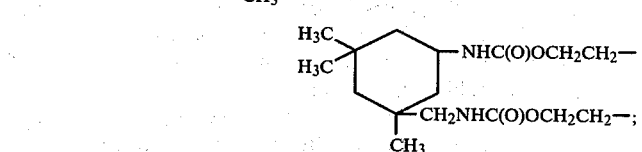

$R^3$ represents hydrogen or ($C_1$ to $C_3$) alkyl; a is an integer from 1 to 20; b is an integer from 1 to 10; and c is an integer from 1 to 5.

Representative of the above useable polyfunctional acrylates are trimethylol propane triacrylate, pentaerythritol tetraacrylate, hexane diol diacrylate, polyethylene glycol (200) diacrylate, ethylene glycol diacrylate, tripropylene glycol diacrylate, trimethyl hexane diol diacrylate, 1,4-cyclohexane dimethanol diacrylate, dibutylene glycol diacrylate, 1,4-cyclohexane diacrylate, dipropylene glycol di-2-acrylyl-ethyl ether, methylenebis(4-cyclohexane-2-acrylyl-ethyl urethane) 2,2,4-trimethylhexanebis(2-acrylyl-ethyl urethane), isophorone di(2-acrylyl-ethyl urethane), and the like.

The three above-recited urethane-containing diacrylates are not known to be commercially available. Accordingly, Examples VII through IX demonstrate a method for the preparation of each urethane-containing diacrylate recited above.

As the diacetoacetamide, use can be made of compounds having the formula $$R^4+NH-C(O)-CH_2-C(O)-CH_3)_2$$

wherein $R^4$ represents: a ($C_1$ to $C_{10}$) alkylene group, a ($C_1$ to $C_4$) alkyl substituted ($C_1$ to $C_{10}$) alkylene group, $+C_2H_4O+_d-C_2H_4-$,

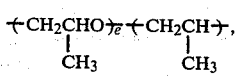

a cycloalkylene group, a cycloalkane bearing two (C₁ to C₃) alkylene groups, —H₆C₃O—(C₂H₄O)—f—(C₂H₄)—OC₃H₆—,

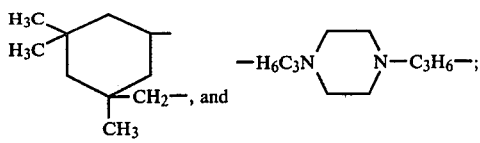

d is an integer from 1 to 6; e is an integer from 1 to 6; and f is an integer from 1 to 4.

Representative of the above usable diacetoacetamides are isophorone diacetoacetamide, diethylene glycol di-3-acetoacetamide propyl ether, N,N'-bis(propyl-3-acetoacetamide)-piperazene, 1,4 cyclohexanebis(methylacetoacetamide), 1,3 cyclohexanebis(methylacetoacetamide), 2,2,4-trimethylhexamethylenediacetoacetamide, 1,3-propanediacetoacetamide, diethyleneglycol-di-2-acetoacetamide-ethyl ether, dipropyleneglycol diacetoacetamide propyl ether, 1,4-cyclohexanebis(acetoacetamide), trimethylhexamethylene diacetoacetamide, and the like.

Unlike most of the polyfunction acrylates, the above usable diacetoacetamides are not known to be commercially available. Accordingly, suitable methods for preparing the diacetoacetamides usable in this invention are set forth in Examples 1 through 6 below.

The amounts of polyfunctional acrylate and diacetoacetamide can be varied within relatively wide ranges. Preferably, about 1 to about 2 moles of polyfunctional acrylate are employed for every mole of diacetoacetamide. Best results are usually obtained when the polyfunctional acrylate is reacted with the diacetoacetamide in a mole ratio of from about 1.2 to about 1.4 moles of polyfunctional acrylate to about 1 mole of diacetoacetamide.

As the catalyst to promote the reaction, a Michael reaction, use can be made of any of a variety of well known Michael reaction-type catalysts commonly employed to promote condensation. Particularly suitable are strong basic catalysts such as sodium methoxide, sodium metal, sodium ethylate, benzyl-trimethyl ammonium methoxide, and the like. Catalytic amounts of materials are selected in accordance with well known practices in the polymer art, the amount being one sufficient to promote the polycondensation reaction. For further information relating to the Michael reaction mechanism, see "The Michael Reaction" by E. D. Bergmann et al., *Organic Reactions,* Vol. 10, chapter 3, pages 179–555, and *Modern Synthetic Reactions,* H. O. House, 2nd Ed. (1972), pages 595–623, both herein incorporated by reference.

The polymerization reaction can be carried out using the reactants as the only reaction medium since both the polyfunctional acrylates and the diacetoacetamides are normally in the liquid state and/or they can be uniformly blended together.

In one embodiment of this invention, if the acrylate-acetoacetamide polymer is employed to produce a wear layer composition, the polymerization reaction can be carried out in the presence of art recognized amounts of optional ingredients typically employed in wear layer compositions such as surfactants, heat and light stabilizers, and the like.

The following examples will serve to more fully illustrate specific embodiments of and the best mode for practicing this invention.

EXAMPLE I

This example demonstrates a method for the preparation of isophorone diacetoacetamide.

About 85 grams (0.5 mole) of isophorone diamine (3-aminomethyl 3,5,5-trimethylcyclohexylamine) and about 325 milliliters of methylene chloride were added to a reaction vessel with stirring.

The contents of the reaction vessel were cooled to and maintained at a temperature of about 15° C. and about 80 grams (0.95 mole) of diketene were added to the contents of the reaction vessel over a period of about 1 hour.

The temperature of the contents of the reaction vessel was held at about 15° C. for about 1¾ hours and the resulting reaction product was transferred to a separatory funnel and acidified with dilute hydrochloric acid.

The reaction product was washed twice, once with about 250 milliliters of water and about 50 milliliters of saturated sodium chloride solution and a second time with about 250 milliliters of water, about 50 milliliters of saturated sodium bicarbonate solution and a sufficient amount (about 5 cc) of saturated NaHCO₃ solution to neutralize the separatory funnel contents to a pH of about 6.

After the second washing, the methylene chloride layer containing the reaction product was dried with anhydrous magnesium sulfate. The magnesium sulfate was filtered off; the methylene chloride was removed by vacuum distillation and the resulting product, isophorone diacetoacetamide, was recovered in a yield of about 132 grams and observed to be viscous and light yellow in color.

EXAMPLE II

This example demonstrates a method for the preparation of diethyleneglycol diacetoacetamide propyl ether.

About 66 grams (0.3 mole) of diethyleneglycol diaminopropyl ether (commercially available from Union Carbide Corporation, designated "Polyglycoldiamine H-221") and about 230 milliliters of methylene chloride were added to a reaction vessel with stirring.

The contents of the reaction vessel were cooled to and maintained at a temperature of about 15° C. and about 50.4 grams (0.6 mole) of diketene were added to the contents of the reaction vessel over a period of about 1 hour.

The temperature of the contents of the reaction vessel was held at about 10° to 15° C. for a period of about 4 hours and the methylene chloride was removed by vacuum distillation.

The resulting reaction product was dissolved in isopropyl alcohol and recrystallized from the alcohol. The resulting product, diethyleneglycol diacetoacetamide propyl ether, was recovered and found to have a melting point range of about 62° to 63° C. and observed to be white in color.

EXAMPLE III

This example demonstrates a method for the preparation of N,N'-bis(propyl-3-acetoacetamide)-piperazine.

The following ingredients were reacted using substantially the procedure of Example I with the exception that the contents of the reaction vessel were held at 10° to 15° C. for a period of about 4 hours instead of the 1¾ hours in Example I.

| Ingredients | Amount |
| --- | --- |
| diketene | 50.4 grams (0.6 mole) |
| N,N'-bis(aminopropyl)-piperazine | 60 grams (0.3 mole) |
| methylene chloride | 250 milliliters |

The resulting product, N,N'-bis(propyl-3-acetoacetamide)-piperazine, was recovered in a yield of about 92 grams and observed to be viscous and light yellow in color.

EXAMPLE IV

This example demonstrates a method for the preparation of 1,4-cyclohexanebis(methylacetoacetamide).

The following ingredients were reacted using substantially the procedure of Example II with the exception that the contents of the reaction vessel were held at about 15° C. for about 2 hours.

| Ingredients | Amount |
| --- | --- |
| diketene | 33.6 grams (0.4 mole) |
| 1,4 cyclohexanebis(methylamine) | 28.4 grams (0.2 mole) |
| methylene chloride | 100 milliliters |

The resulting crude product, 1,4-cyclohexanebis(methylacetoacetamide), was recovered and recrystallized from isopropyl alcohol. The recrystallized product was found to have a melting point range of about 140° to 143° C. and observed to be white in color.

EXAMPLE V

This example demonstrates a method for the preparation of 1,3-cyclohexanebis(methylacetoacetamide).

The following ingredients were reacted using substantially the procedure of Example II with the exception that chloroform was substituted for the methylene chloride, and rather than recrystallizing in isopropyl alcohol, the reaction product was washed in benzene.

| Ingredients | Amount |
| --- | --- |
| diketene | 84 grams (1 mole) |
| 1,3-cyclohexanebis(methylamine) | 71 grams (0.5 mole) |
| chloroform | 250 milliliters |

The benzene insoluble fraction of the reaction product was recovered as 1,3-cyclohexanebis(methylacetoacetamide) and found to have a melting point range of about 105° to 115° C. and observed to be light yellow in color.

EXAMPLE VI

This example demonstrates a method for the preparation of 2,2,4-trimethylhexamethylenediacetoacetamide.

The following ingredients were reacted using substantially the procedure of Example I with the exception that the contents of the reaction vessel were held at 10° to 15° C. for a period of about 2 hours instead of the 1¾ hours in Example I.

| Ingredients | Amount |
| --- | --- |
| diketene | 49.2 grams (0.59 mole) |
| trimethylhexanediamine | 45.3 grams (0.31 mole) |
| methylene chloride | 150 milliliters |

The resulting product, 2,2,4-trimethylhexamethylenediacetoacetamide, was recovered in a yield of about 89 grams and observed to be light yellow in color and viscous.

EXAMPLE VII

This example demonstrates the preparation of a urethane-containing diacrylate.

About 1 mole of methylenebis-4-cyclohexane isocyanate (designated "Hylene W", commercially available from E. I. DuPont de Nemours Co.) and about 2 moles of hydroxyethylacrylate and about 0.05 gram of dibutyltin catalyst were added to a reaction vessel at room temperature, with stirring. The temperature of the reaction vessel was increased to about 60° C. After about 3 hours, the resulting reaction product, methylenebis(4-cyclohexane-2-acrylyl-ethyl urethane), having the formula

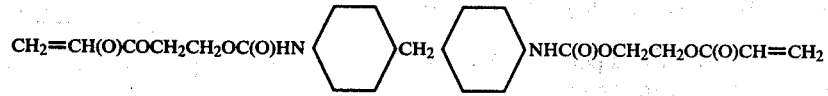

was recovered.

EXAMPLE VIII

This example demonstrates the preparation of a urethane-containing diacrylate.

About 1 mole of 2,2,4-trimethylhexane diisocyanate (designated "TMDI", commercially available from Thorson Chemical Co.) and about 2 moles of hydroxyethylacrylate and about 0.05 gram of dibutyltin catalyst were added to a reaction vessel at room temperature, with stirring. The temperature of the reaction vessel was increased to about 60° C. After about 3 hours, the resulting reaction product, 2,2,4-trimethylhexanebis(2-acrylyl-ethyl urethane), having the formula

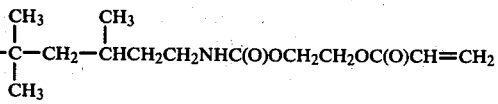

was recovered.

EXAMPLE IX

This example demonstrates the preparation of a urethane-containing diacrylate.

About 1 mole of 3-isocyanatomethyl-3,5,5-trimethylcyclohexyl isocyanate (designated "IPDI" isophorone diisocyanate, commercially available from Thorson Chemical Co.) and about 2 moles of hydroxyethylacrylate and about 0.05 gram of dibutyltin catalyst were added to a reaction vessel at room temperature, with stirring. The temperature of the reaction vessel was increased to about 60° C. After about 3 hours, the resulting reaction product, isophorone di(2-acrylyl-ethyl urethane), having the formula

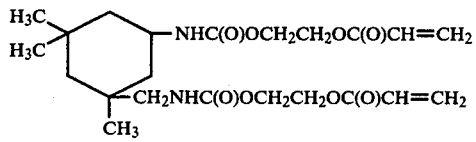

was recovered.

EXAMPLE X

This example demonstrates the preparation of a polymer film of this invention.

About 3.8 grams of hexanediol diacrylate, about 4.6 grams of the 2,2,4-trimethylhexamethylenediacetoacetamide of Example VI, about 0.01 gram of a 30% by weight polyethyleneoxide siloxane surfactant (Dow Corning DC-193) in methanol solution and about 0.03 gram of a 40% by weight benzyltrimethyl ammonium methoxide in methanol catalyst solution were added to a reaction vessel at room temperature with stirring.

The resulting polymer mixture was coated on a glass surface using a Bird applicator to a coating thickness of about 0.003 inch.

The coating was non-tacky after about 1 hour and was allowed to cure overnight at a temperature of about 60° C.

The resulting cured polymer film was removed from the glass surface and observed to be clear and colorless. The film was tested by differential scanning calorimetery (DuPont 900 Thermal Analyzer) and found to have a Tg range of about 18° to about 30° C. with a Tg midpoint of about 24° C. The cured polymer film was also subjected to a steel wool scratch test and observed to exhibit good scratch resistance.

EXAMPLE XI

The following ingredients were reacted using substantially the procedure of Example VII.

| Ingredients | Amount |
| --- | --- |
| hexanediol diacrylate | 3.5 grams |
| N,N'-bis(propyl-3-acetoacetamide)-piperazine of Example III | 4.8 grams |
| 30% by weight "DC-193" in methanol solution | 0.01 grams |
| 40% by weight benzyltrimethyl ammonium methoxide in methanol catalyst solution | 0.03 grams |

The resulting mixture was coated on a glass surface and cured at about 16° C. for about 16 hours.

The resulting cured polymer film was removed from the glass surface and observed to be clear and colorless. The film was tested and found to have a Tg range of about 17° to 31° C. with a Tg midpoint of about 24° C. The polymer film was found to exhibit good scratch resistance.

EXAMPLE XII

The following ingredients were reacted using substantially the procedure of Example VII.

| Ingredients | Amount |
| --- | --- |
| hexanediol diacrylate | 6.6 grams |
| 1,3-cyclohexanebis(methylacetoacetamide of Example V | 4.6 grams |
| diethyleneglycol diacetoacetamide propyl ether of Example II | 2.4 grams |
| 30% by weight "DC-193" in methanol solution | 0.05 grams |
| 40% by weight benzyltrimethyl ammonium methoxide in methanol catalyst solution | 0.10 grams |

The resulting polymer mixture was coated on a glass surface and cured at about 16° C. for about 16 hours.

The resulting cured polymer film was removed from the glass surface and observed to be clear and colorless. The film was tested and found to have a Tg range of about 17° to 35° C. with a Tg midpoint of about 26° C. The polymer film was found to exhibit good scratch resistance.

EXAMPLE XIII

The following ingredients were reacted using substantially the procedure of Example VII.

| Ingredients | Amount |
| --- | --- |
| hexanediol diacrylate | 7.0 grams |
| 2,2,4-trimethylhexamethylenediacetoacetamide of Example VI | 4.8 grams |
| 1,3 cyclohexanebis(methylacetoacetamide) of Example V | 2.0 grams |
| 30% by weight "DC-193" in methanol solution | 0.05 grams |
| 40% by weight benzyltrimethyl ammonium methoxide in methanol catalyst solution | 0.10 grams |

The resulting polymer mixture was coated on a glass surface and cured at about 16° C. for about 16 hours.

The resulting cured polymer film was removed from the glass surface and observed to be clear and colorless. The film was tested and found to have a Tg range of about 17° to 35° C. with a Tg midpoint of about 28° C. The polymer film was found to exhibit good scratch resistance.

EXAMPLE XIV

The following ingredients were reacted using substantially the procedure of Example VII.

| Ingredients | Amount |
| --- | --- |
| polyethylene glycol 200 diacrylate | 3.1 grams |
| isophorone diacetoacetamide of Example I | 1.1 grams |
| 1,4-cyclohexanebis(methylacetoacetamide) of Example IV | 1.0 grams |
| 40% by weight benzyltrimethyl ammonium methoxide in methanol catalyst solution | 0.05 grams |

The resulting polymer mixture was transferred to an aluminum dish and was tack-free after curing for 20 minutes at 60° C. The polymer composition was allowed to cure at 60° C. for about 16 hours.

The cured polymer was observed to be clear and light yellow in color and found to have a Tg range of about 11° to 27° C. and a Tg midpoint of 19° C.

The following Table I contains Examples XV through XXVII. All polymer compositions were prepared using substantially the procedure of Example XIV and were catalyzed using 0.05 gram of a 10% by weight sodium ethylate in ethanol solution per every 5 grams of the total amount of polyfunctional acrylate and diacetoacetamide.

Table I

Tg of Cured Acrylate-Isophorone Diacetoacetamide Polymer Compositions

| Example No. | Ingredients and Amount (Moles) | Tg Range | Tg Midpoint |
|---|---|---|---|
| XV | 1.0 EGDA[1] 1.0 IPDAA[2] | 45°–61° | 53° |
| XVI | 1.2 EGDA[1] 1.0 IPDAA[2] | 41°–57° | 49° |
| XVII | 1.4 EGDA[1] 1.0 IPDAA[2] | 28°–45° | 37° |
| XVIII | 1.0 HDDA[3] 1.0 IPDAA | 17°–46° | 32° |
| XIX | 1.2 HDDA[3] 1.0 IPDAA | 27°–49° | 38° |
| XX | 1.4 HDDA[3] 1.0 IPDAA | 24°–51° | 38° |
| XXI | 1.6 HDDA[3] 1.0 IPDAA | 11°–37° | 24° |
| XXII | 1.0 TPGDA[4] 1.0 IPDAA | 11°–36° | 24° |
| XXIII | 1.2 TPGDA[4] 1.0 IPDAA | 14°–38° | 26° |
| XXIV | 1.6 TPGDA[4] 1.0 IPDAA | 16°–38° | 27° |
| XXV | 1.0 PEG200DA[5] 1.0 IPDAA | 15°–40° | 28° |
| XXVI | 1.2 PEG200DA[5] 1.0 IPDAA | 16°–39° | 29° |
| XXVII | 1.6 PEG200DA[5] 1.0 IPDAA | 2°–26° | 14° |

[1]EGDA - ethylene glycol diacrylate
[2]IPDAA - isophorone diacetoacetamide
[3]HDDA - hexanedioldiacrylate
[4]TPGDA - tripropylene glycol diacrylate
[5]PEG200DA - polyethylene glycol 200 diacrylate The following Table II contains Examples XXVIII through XXXII. All polymer films were prepared using substantially the procedure of Example I and were catalyzed using 0.04 grams of a 15% by weight sodium methylate in methanol solution per every 8 grams of the total amount of polyfunctional acrylate and diacetoacetamide.

Table II

Tg of Cured Acrylate-Acetoacetamide Polymer Films

| Example No. | Ingredients and Amount (Moles) | | | Tg Range | Tg Midpoint |
|---|---|---|---|---|---|
| XXVIII | 1.40 HDDA[1] | | 1.0 TMHMDAA[2] | 25°–37° | 31° |
| XXIX | 1.33 HDDA[1] | .05 TMPTA[3] | 1.0 TMHMDAA[2] | 27°–40° | 33° |
| XXX | 1.25 HDDA[1] | .10 TMPTA[3] | 1.0 TMHMDAA[2] | 30°–45° | 38° |
| XXXI | 1.18 HDDA[1] | .15 TMPTA[3] | 1.0 TMHMDAA[2] | 32°–46° | 39° |
| XXXII | 1.10 HDDA[1] | .20 TMPTA[3] | 1.0 TMHMDAA[2] | 30°–47° | 39° |

[1]HDDA - hexanedioldiacrylate
[2]TMHMDAA - trimethylhexamethylenediacetoacetamide
[3]TMPTA - trimethylolpropane triacrylate

EXAMPLE XXXIII

This example demonstrates the preparation of a polymer film of this invention using the urethane-containing diacrylate of Example VIII.

About 3.6 grams of the urethane-containing diacrylate of Example VIII, about 1.4 grams of polyethylene glycol 200 diacrylate, about 3.2 grams of trimethylhexamethylenediacetoacetamide, 0.03 gram of a 30% by weight "DC-193" in methanol solution, and about 0.07 gram of a 40% by weight benzyltrimethyl ammonium methoxide in methanol catalyst solution were added to a reaction vessel at room temperature, with stirring.

The resulting polymer mixture was coated on a glass surface using a Bird applicator to a coating or film thickness of 0.003 inch.

The polymer coating was allowed to cure for about 16 hours at a temperature of about 70° C.

The resulting cured polymer film was removed from the glass surface and observed to be clear, colorless, and flexible.

EXAMPLE XXXIV

This example demonstrates the preparation of a polymer film of this invention using the urethane-containing diacrylate of Example IX.

About 3.0 grams of the urethane-containing diacrylate of Example IX, about 2.2 grams of polyethylene glycol 200 diacrylate, about 3.2 grams of trimethylhexamethylenediacetoacetamide, 0.03 gram of a 30% by weight "DC-193" in methanol solution, and about 0.07 gram of a 40% by weight benzyltrimethyl ammonium methoxide in methanol catalyst solution were added to a reaction vessel at room temperature, with stirring.

The resulting polymer mixture was coated on a glass surface using a Bird applicator to a coating or film thickness of 0.003 inch.

The polymer coating was allowed to cure for about 16 hours at a temperature of about 70° C.

The resulting cured polymer film was removed from the glass surface and observed to be clear, colorless, and flexible.

EXAMPLE XXXV

This example demonstrates the preparation of a polymer film of this invention using the urethane-containing diacrylate of Example VII.

About 3.7 grams of the urethane-containing diacrylate of Example VII, about 1.4 grams of polyethylene glycol 200 diacrylate, about 3.2 grams of trimethylhexamethylenediacetoacetamide, 0.03 gram of a 30% by weight "DC-193" in methanol solution, and about 0.07 gram of a 40% by weight benzyltrimethyl ammonium methoxide in methanol catalyst solution were added to a reaction vessel at room temperature, with stirring.

The resulting polymer mixture was coated on a glass surface using a Bird applicator to a coating or film thickness of 0.003 inch.

The polymer coating was allowed to cure for about 16 hours at a temperature of about 70° C.

The resulting cured polymer film was removed from the glass surface and observed to be clear, colorless, and flexible.

EXAMPLE XXXVI

This example demonstrates the preparation of a thermoplastic floor covering coated with a wear layer composition comprising a crosslinked acrylate-acetoacetamide polymer of this invention.

About 7.5 grams of hexanediol diacrylate, about 4.0 grams of tripropylene glycol diacrylate, about 8.6 grams of trimethylhexamethylene diacetoacetamide, 2.1 grams of 1,3-cyclohexanebis(methylacetoacetamide) and 0.15 grams of a 40% by weight benzyltrimethyl ammonium methoxide in methanol catalyst solution were added to a mixing vessel with stirring at room temperature.

The resulting wear layer composition was applied using a conventional applicator, in this example a Bird applicator, to a 12"×12" white vinyl tile and cured at 60° C. for about 16 hours.

The resulting cured acrylate-acetoacetamide polymer wear layer on the tile was observed to be clear and colorless.

The wear layer coated tile was tested for gloss retention using an art recognized traffic wheel test. The initial gloss value, before testing, was 86. After 30 minutes of testing, the gloss value was 77. After 60 minutes of testing, the gloss value was 69. And after 90 minutes of testing, the gloss value was 69. The wear layer was also subjected to an art recognized steel wool scratch test and found to exhibit good scratch resistance.

It will be evident from the foregoing that various modifications can be made to the present invention. Such, however, are considered as being within the scope of the invention.

What is claimed is:

1. A crosslinked acrylate-acetoacetamide polymer produced by the reaction of at least one polyfunctional acrylate with at least one diacetoacetamide in the presence of a catalyst capable of promoting the reaction between the polyfunctional acrylate and the diacetoacetamide.

2. The crosslinked polymer of claim 1 in which said polyfunctional acrylate has the formula $$R+O-C(O)-CH=CH_2)_4$$

wherein R represents

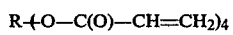

3. The crosslinked polymer of claim 1 in which said polyfunctional acrylate has the formula $$R^1+O-C(O)-CH=CH_2)_3$$

wherein $R^1$ represents

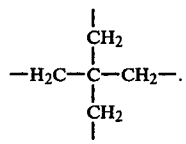

and $R_3$ represents hydrogen or ($C_1$ to $C_3$) alkyl.

4. The crosslinked polymer of claim 1 in which said polyfunctional acrylate has the formula $$R^2+O-C(O)-CH=CH_2)_2$$

wherein $R^2$ represents: a ($C_1$ to $C_{10}$) alkylene group, a ($C_1$ to $C_4$) alkyl substituted ($C_1$ to $C_{10}$) alkylene group, $+C_2H_4O+_a+C_2H_4+$,

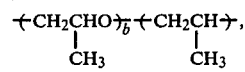

$+CH_2CH_2CH_2CH_2O+_c CH_2CH_2CH_2CH_2-$, a cycloalkylene group, a cycloalkane bearing two ($C_1$ to $C_3$) alkylene groups,

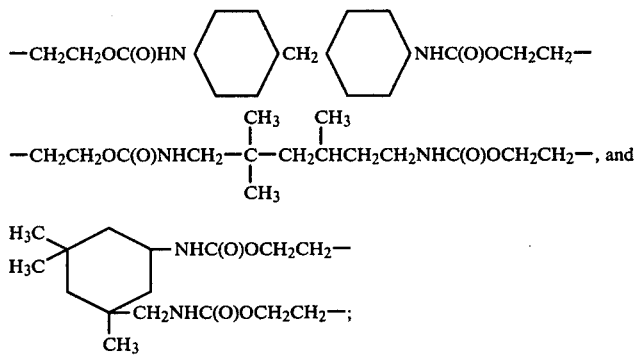

a is an integer from 1 to 20; b is an integer from 1 to 10; and c is an integer from 1 to 5.

5. The crosslinked polymer of claim 1 in which said diacetoacetamide has the formula $$R^4+NH-C(O)-CH_2-C(O)-CH_3)_2$$

wherein $R^4$ represents: a ($C_1$ to $C_{10}$) alkylene group, a ($C_1$ to $C_4$) alkyl substituted ($C_1$ to $C_{10}$) alkylene group, $+C_2H_4O+_d-C_2H_4-$,

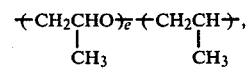

a cycloalkylene group, a cycloalkane bearing two ($C_1$ to $C_3$) alkylene groups, $-H_6C_3O+C_2H_4O+_f+C_2H_4+OC_3H_6-$,

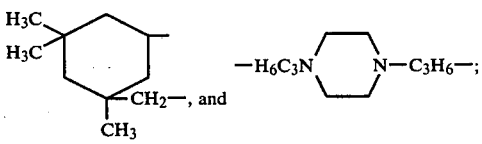

d is an integer from 1 to 6; e is an integer from 1 to 6; and f is an integer from 1 to 4.

6. The crosslinked polymer of claim 1 wherein the said polyfunctional acrylate is reacted with the diacetoacetamide in a mole ratio of from about 1 to about 2 moles of polyfunctional acrylate to about 1 mole of diacetoacetamide.

7. The crosslinked polymer of claim 1 wherein the said polyfunctional acrylate is reacted with the diacetoacetamide in a mole ratio of from about 1.2 to about 1.4 moles of polyfunctional acrylate to about 1 mole of diacetoacetamide.

8. The crosslinked polymer of claim 1 wherein said catalyst is a strong basic catalyst.

* * * * *